(12) United States Patent
Yang

(10) Patent No.: US 12,496,396 B2
(45) Date of Patent: *Dec. 16, 2025

(54) BILATERAL-DRIVEN MEDICAL DEVICE WITH INFUSION AND DETECTION INTEGRATED

(71) Applicant: MEDTRUM TECHNOLOGIES INC., Shanghai (CN)

(72) Inventor: Cuijun Yang, Shanghai (CN)

(73) Assignee: MEDTRUM TECHNOLOGIES INC., Shanghai (CN)

( * ) Notice: Subject to any disclaimer, the term of this patent is extended or adjusted under 35 U.S.C. 154(b) by 947 days.

This patent is subject to a terminal disclaimer.

(21) Appl. No.: 17/620,078

(22) PCT Filed: Jun. 1, 2020

(86) PCT No.: PCT/CN2020/093705
§ 371 (c)(1),
(2) Date: Dec. 16, 2021

(87) PCT Pub. No.: WO2021/012796
PCT Pub. Date: Jan. 28, 2021

(65) Prior Publication Data
US 2022/0304597 A1    Sep. 29, 2022

(30) Foreign Application Priority Data
Jul. 19, 2019   (WO) ............... PCT/CN2019/096673

(51) Int. Cl.
*A61M 5/14* (2006.01)
*A61B 5/00* (2006.01)
(Continued)

(52) U.S. Cl.
CPC ....... *A61M 5/1723* (2013.01); *A61B 5/14532* (2013.01); *A61B 5/1473* (2013.01);
(Continued)

(58) Field of Classification Search
CPC ................ A61M 5/1452; A61M 5/14248
See application file for complete search history.

(56) References Cited

U.S. PATENT DOCUMENTS

| | | | |
|---|---|---|---|
| 2005/0059871 A1 | 3/2005 | Gough et al. | |
| 2005/0238507 A1 | 10/2005 | Dalanni et al. | |

(Continued)

FOREIGN PATENT DOCUMENTS

| | | |
|---|---|---|
| CN | 103463695 | 12/2013 |
| CN | 108331731 | 7/2018 |

(Continued)

OTHER PUBLICATIONS

"International Search Report (Form PCT/ISA/210) of PCT/CN2020/093705," mailed on Sep. 3, 2020, pp. 1-4.

(Continued)

*Primary Examiner* — Courtney B Fredrickson
(74) *Attorney, Agent, or Firm* — JCIP GLOBAL INC.

(57) ABSTRACT

The invention discloses a bilateral-driven medical device with infusion and detection integrated, comprising: drug infusion unit; program unit comprising input end and output end, and the input end comprises a plurality of electrically connective regions for receiving signals of analyte data in the body fluid, after the output end is electrically connected to the power unit, the program unit controls whether the drug infusion unit delivers drugs; and an infusion cannula provided with at least two detecting electrodes, the infusion cannula is the drug infusion channel, the electrodes are disposed on the cannula wall. It takes only one insertion to perform both analyte detection and drug infusion.

10 Claims, 11 Drawing Sheets

(51) Int. Cl.
  *A61B 5/145* (2006.01)
  *A61B 5/1473* (2006.01)
  *A61F 2/02* (2006.01)
  *A61M 5/142* (2006.01)
  *A61M 5/145* (2006.01)
  *A61M 5/158* (2006.01)
  *A61M 5/172* (2006.01)
  *G16H 20/17* (2018.01)
  *G16H 40/63* (2018.01)
  *A61M 5/20* (2006.01)

(52) U.S. Cl.
  CPC ............ *A61B 5/4839* (2013.01); *A61F 2/022* (2013.01); *A61M 5/14236* (2013.01); *A61M 5/14244* (2013.01); *A61M 5/14248* (2013.01); *A61M 5/1452* (2013.01); *A61M 5/1454* (2013.01); *A61M 5/158* (2013.01); *A61M 5/172* (2013.01); *G16H 20/17* (2018.01); *G16H 40/63* (2018.01); *A61B 2560/0209* (2013.01); *A61B 2562/043* (2013.01); *A61M 5/1413* (2013.01); *A61M 2005/14208* (2013.01); *A61M 2005/14252* (2013.01); *A61M 2005/14268* (2013.01); *A61M 2005/14506* (2013.01); *A61M 2005/1585* (2013.01); *A61M 2005/1726* (2013.01); *A61M 2005/2006* (2013.01); *A61M 2205/0216* (2013.01); *A61M 2205/0233* (2013.01); *A61M 2205/0266* (2013.01); *A61M 2205/33* (2013.01); *A61M 2205/3317* (2013.01); *A61M 2205/3327* (2013.01); *A61M 2205/3553* (2013.01); *A61M 2205/3576* (2013.01); *A61M 2205/3592* (2013.01); *A61M 2205/50* (2013.01); *A61M 2205/502* (2013.01); *A61M 2209/088* (2013.01); *A61M 2230/005* (2013.01); *A61M 2230/20* (2013.01); *A61M 2230/201* (2013.01)

(56) References Cited

U.S. PATENT DOCUMENTS

| | | | |
|---|---|---|---|
| 2007/0191702 A1 | 8/2007 | Yodfat et al. | |
| 2008/0214916 A1* | 9/2008 | Yodfat | A61B 5/14532 600/347 |
| 2012/0277667 A1* | 11/2012 | Yodat | A61B 5/1451 604/65 |
| 2014/0350460 A1* | 11/2014 | Moore | A61M 5/19 604/89 |
| 2017/0105675 A1* | 4/2017 | Zhou | A61B 5/0215 |
| 2019/0117881 A1* | 4/2019 | Yang | A61M 5/16804 |

FOREIGN PATENT DOCUMENTS

| | | | |
|---|---|---|---|
| WO | 2008078319 | 7/2008 | |
| WO | 2009088608 | 7/2009 | |
| WO | 2011064780 | 6/2011 | |
| WO | 2013104665 | 7/2013 | |
| WO | WO-2017181324 A1 * | 10/2017 | ............ A61M 5/142 |
| WO | 2018027937 | 2/2018 | |

OTHER PUBLICATIONS

"Search Report of Europe Counterpart Application", issued on Aug. 7, 2023, pp. 1-8.

* cited by examiner

BILATERAL-DRIVEN MEDICAL DEVICE WITH INFUSION AND DETECTION INTEGRATED

CROSS-REFERENCE TO RELATED APPLICATION

This application is a 371 of international application of PCT application serial no. PCT/CN2020/093705, filed on Jun. 1, 2020, which claims the priority benefits of PCT application serial no. PCT/CN2019/096673, filed on Jul. 19, 2019. The entirety of each of the above-mentioned patent applications is hereby incorporated by reference herein and made a part of this specification.

TECHNICAL FIELD

The present invention mainly relates to the field of medical instruments, in particular to a bilateral-driven medical device with infusion and detection integrated.

BACKGROUND

Diabetes is mainly a metabolic disease caused by abnormal human pancreatic function. Diabetes is a lifelong disease. At present, medical technology cannot cure diabetes. It can only control the occurrence and development of diabetes and its complications by stabilizing blood glucose. The normal human pancreas automatically monitors changes in the body's blood glucose levels and automatically secretes the required insulin. At present, the medical device for stabilizing blood glucose works by dynamically monitoring the blood glucose changes of the human body by a glucose sensor implanted in the subcutaneous tissue of the human body; and continuously accurately infusing insulin into the subcutaneous tissue of the human body through a medical cannula implanted in the subcutaneous tissue of the human body.

This method requires separately inserting glucose sensor and infusion cannula under the human skin. Even though there are some devices that can integrate the sensor probe and the infusion cannula into one device, the sensor and cannula still need to be separately inserted at different positions, increasing the risk of infection.

Therefore, there is a need in the prior art for a bilateral-driven medical device with infusion and detection integrated that can perform both detection and infusion at the same time.

BRIEF SUMMARY OF THE INVENTION

Embodiments of the present invention disclose a bilateral-driven medical device with infusion and detection integrated in which multiple electrodes are disposed on an infusion cannula also acted as an infusion channel. It takes only one insertion to perform both analyte detection and drug infusion, thus reducing the risk of infection.

The invention discloses a bilateral-driven medical device with infusion and detection integrated, comprising: drug infusion unit, including: at least one drug storage unit; a screw connected to a piston and a driving wheel provided with wheel teeth, respectively, the driving wheel drives the screw to move by rotation, pushing the piston, provided in the drug storage unit, forward; a driving unit cooperating with the driving wheel, the driving unit includes at least two driving portions, the driving unit pivots, around a pivot shaft, in different pivot modes, thus driving the driving portions, in different directions, to push the wheel teeth to rotate the driving wheel; a power unit connected to the driving unit, the power unit outputs two forces in different directions on the driving unit, making the driving unit have multiple pivot modes; a program unit comprising input end and output end, and the input end comprises a plurality of electrically connective regions for receiving signals of analyte data in the body fluid, after the output end is electrically connected to the power unit, according to the received signals of analyte data in the body fluid, the program unit controls the pivot modes of the driving unit to implement whether the drug infusion unit delivers drugs; and an infusion cannula provided with at least two detecting electrodes, the infusion cannula is the drug infusion channel, the electrodes are disposed on the cannulawall, when the infusion cannula is installed to the working position, the infusion cannula is connected with the drug infusion unit, the drug can then be injected into the body through the infusion cannula, and the different electrodes are electrically connected to different electrically connective regions respectively, inputting signal of analyte data in the body fluid to the program unit.

According to one aspect of this invention, the electrodes are located on the outer surface of the cannula wall or in the cannula wall.

According to one aspect of this invention, the electrodes are located on the outer surface of the cannula wall, and when the infusion cannula is installed to the working position, different electrodes are directly electrically connected to different electrically connective regions, respectively.

According to one aspect of this invention, the electrodes are located on the subcutaneous part of the outer surface of the cannula wall, and the outer surface of the cannula wall is further provided with electrode leads electrically connected to the electrodes, and when the infusion cannula is installed to the working position, different electrode leads are electrically connected to different electrically connective regions, respectively.

According to one aspect of this invention, the infusion cannula includes an inner layer cannula and at least one outer layer cannula, and the outer layer cannulas are disposed outside the inner layer cannula, and the inner layer cannula is used for drug infusion.

According to one aspect of this invention, at least one electrode is provided between the outer wall of the inner layer cannula and the outermost cannula.

According to one aspect of this invention, when the infusion cannula is installed to the working position, the electrode located on the outer wall surface of the inner layer cannula is entirely exposed in the subcutaneous tissue fluid, or covered in whole or in part by the outer layer cannulas.

According to one aspect of this invention, when the electrode located on the outer wall surface of the inner layer cannula is covered in whole or in part by the outer layer cannulas, the material of the outer layer cannula walls is permeable membrane or a semi-permeable membrane.

According to one aspect of this invention, the electrodes include working electrode and auxiliary electrode, and the number of the working electrode(s) and the auxiliary electrode(s) is one or more, respectively.

According to one aspect of this invention, the auxiliary electrode is counter electrode, or the auxiliary electrode includes counter electrode and reference electrode.

According to one aspect of this invention, a plurality of electrodes form one or more electrode combinations, each electrode combination comprising working electrode and auxiliary electrode, the program unit choosing one or more electrode combinations to detect analyte data in body fluid.

According to one aspect of this invention, the input end is an elastic member, and the elastic member comprises one of or a combination of conductive strip, oriented conductive silica gel, conductive ring and conductive ball.

According to one aspect of this invention, the drug infusion unit includes a plurality of infusion subunits, the plurality of infusion subunits being electrically connected to the output ends, respectively, and the program unit controlling whether each infusion subunit delivers drugs.

According to one aspect of this invention, the bilateral-driven medical device with infusion and detection integrated is composed of a plurality of parts, the drug infusion unit and the program unit are arranged in different parts, and the different parts are connected by waterproof plugs.

According to one aspect of this invention, the pivot mode of the driving unit includes pivot amplitude or pivot rate, and multiple different pivot modes include multiple different pivot amplitudes or pivot rates.

According to one aspect of this invention, the driving wheel includes at least two sub-wheels, the pivot shaft is disposed between the two sub-wheels, one or more of the driving portions are provided on both sides of the driving unit, and each sub-wheel is cooperated with each driving portion.

According to one aspect of this invention, two driving portions are respectively provided on both sides of the driving unit, and the two driving portions on one side of the driving unit are disposed up and down or left and right.

Compared with the prior arts, the technical solution of the present invention has the following advantages:

In the bilateral-driven medical device with infusion and detection integrated disclosed herein, an infusion cannula provided with at least two detecting electrodes. The infusion cannula performs analyte detection and drug infusion at the same time. Once the puncture is performed at one position, the analyte detection and the drug infusion can be completed simultaneously, reducing the risk of the user's infection. Secondly, when the infusion cannula is installed to the working position, the infusion cannula connects with the drug infusion unit to allow the drugs to flow through the infusion cannula into the body, and the different electrodes are electrically connected to different electrically connective regions inputting the analyte data signal to the program unit. With this design method, after the user attaches the infusion device to the skin surface, the mounting unit for installing the infusion cannula is pressed. When the infusion cannula is installed to the working position, the infusion device can begin to work. This approach reduces the user's pre-using steps and improves the user experience. In addition, the power unit exerts two different forces on the driving unit in different directions, making the driving unit have multiple pivot modes. The user or the closed-loop system can flexibly select the infusion mode according to the actual needs, thus making the infusion process controlled accurately.

Furthermore, when the electrode located on the outer wall surface of the inner layer cannula is covered in whole or in part by the outer layer cannulas, the material of the outer layer cannulas wall is permeable membrane or a semipermeable membrane. The cannula wall material is selected from a permeable membrane or a semi-permeable membrane to ensure the required analyte passes through the cannula wall to the electrode surface. It can improve the flexibility of electrode position design without affecting the detection.

Furthermore, a plurality of electrodes constitute one or more electrode combinations, each electrode combination includes working electrode and auxiliary electrode, and the program unit selects one or more electrode combinations to detect the body fluid analyte data. On the one hand, when a combination of electrodes fails to detect, the program unit can select other electrode combinations for detection according to the situation to ensure the detection process of the body fluid signal is uninterrupted. On the other hand, the program unit can select multiple electrode combinations to work at the same time, performing statistical analysis on multiple sets of data of the same parameter at the same time, improving the detection accuracy of the analyte data, and then issue a more accurate infusion signal.

Furthermore, the drug infusion unit comprises a plurality of infusion subunits, the plurality of infusion subunits being electrically connected to the output end respectively, and the program unit controlling whether each infusion subunit delivers drugs. Different drugs are reserved in different infusion subunits, and the program unit sends different drug infusion instructions to different infusion subunits to achieve precise control of the analyte level in body fluid.

Furthermore, the pivot mode of the driving unit includes pivot amplitude or pivot rate, and multiple pivot modes include a plurality of different pivot amplitudes or pivot rates. The user or closed-loop system can flexibly select the appropriate pivot amplitude or pivot rate of the driving unit according to the actual needs of the body, thereby selecting the appropriate infusion mode.

BRIEF DESCRIPTION OF THE DRAWINGS

FIG. 3b is a side view of the driving unit in FIG. 3a;

DETAILED DESCRIPTION

Figure 1:
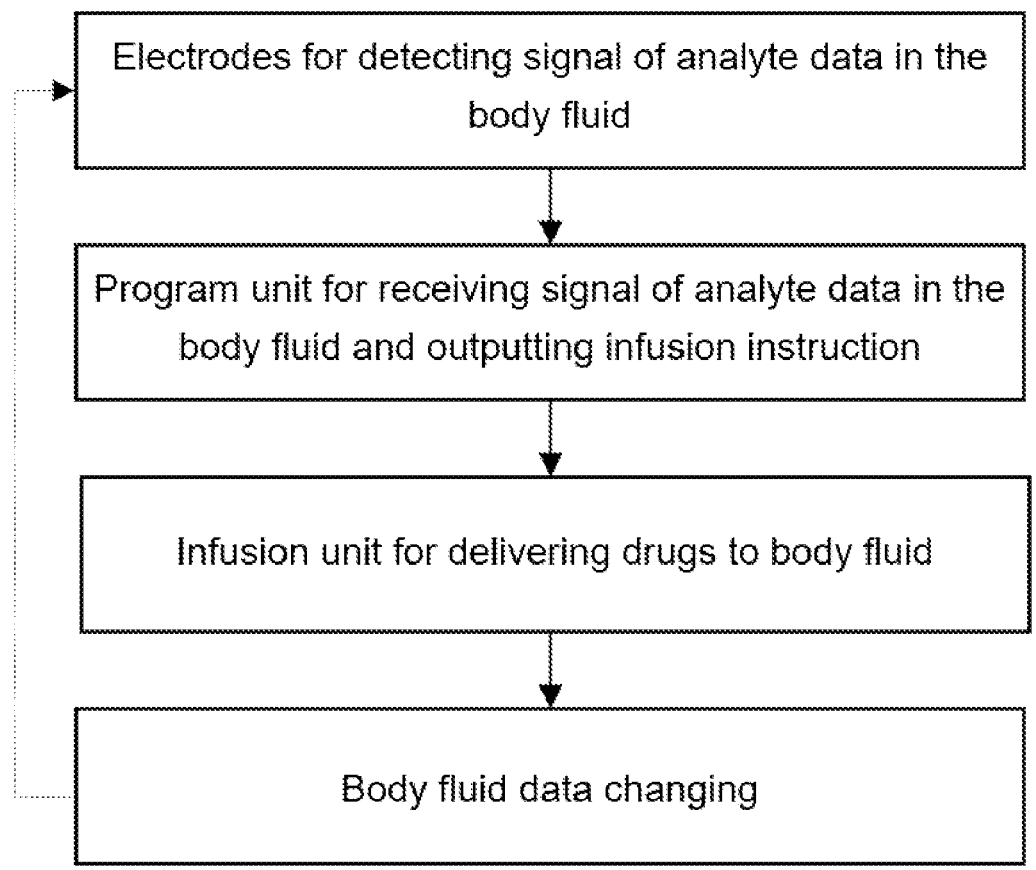
FIG. 1 is a flow chart of the operation of a bilateral-driven medical device with infusion and detection integrated according to an embodiment of the present invention.

As described above, in the prior art device, the detection and the infusion are performed separately to control the analyte level in the body fluid, and it is necessary to puncture at multiple positions on the skin, thereby increasing the pain of the user and increasing the risk of infection.

The study found that the cause of the above problems is that the sensor detection device and the drug infusion device are two independent units. Or even if the two are designed into a single structure, multiple puncture positions are still required on the body surface.

In order to solve this problem, the present invention provides a bilateral-driven medical device with infusion and detection integrated, the infusion cannula is used for detecting analyte data and a drug infusion channel. And it can perform detection and infusion with only one puncture.

Various exemplary embodiments of the present invention will now be described in detail with reference to the drawings. The relative arrangement of the components and the steps, numerical expressions and numerical values set forth in the embodiments are not to be construed as limiting the scope of the invention.

In addition, it should be understood that, for ease of description, the dimensions of the various components shown in the figures are not necessarily drawn in the actual scale relationship, for example, the thickness, width, length or distance of certain units may be exaggerated relative to other structures.

The following description of the exemplary embodiments is merely illustrative, and is not intended to be in any way limiting the invention and its application or use. The techniques, methods and devices that are known to those of ordinary skill in the art may not be discussed in detail, but such techniques, methods and devices should be considered as part of the specification.

It should be noted that similar reference numerals and letters indicate similar items in the following figures. Therefore, once an item is defined or illustrated in a drawing, it will not be discussed further in the following description of the drawings.

FIG. 1 is a flow chart showing the operation of a bilateral-driven medical device with infusion and detection integrated according to an embodiment of the present invention.

The bilateral-driven medical device with infusion and detection integrated of the embodiment of the invention comprises three basic parts: electrodes, a program unit and a drug infusion unit. The body fluid analyte data is obtained by the electrodes and converted into an electrical signal. Electrical signals are passed to the program unit via electrodes and/or electrode leads. After analyzing the body fluid analyte data signal, the program unit, through the power unit, sends a signal to the drug infusion unit controlling whether to perform a drug infusion, thereby stabilizing the body fluid parameters. The body fluid analyte data are detected by the electrodes in real time, and the cycle of detection and infusion is without interruption. This process does not require human intervention and is done directly through program analysis to control the stability of body fluid parameters.

Figure 2A:
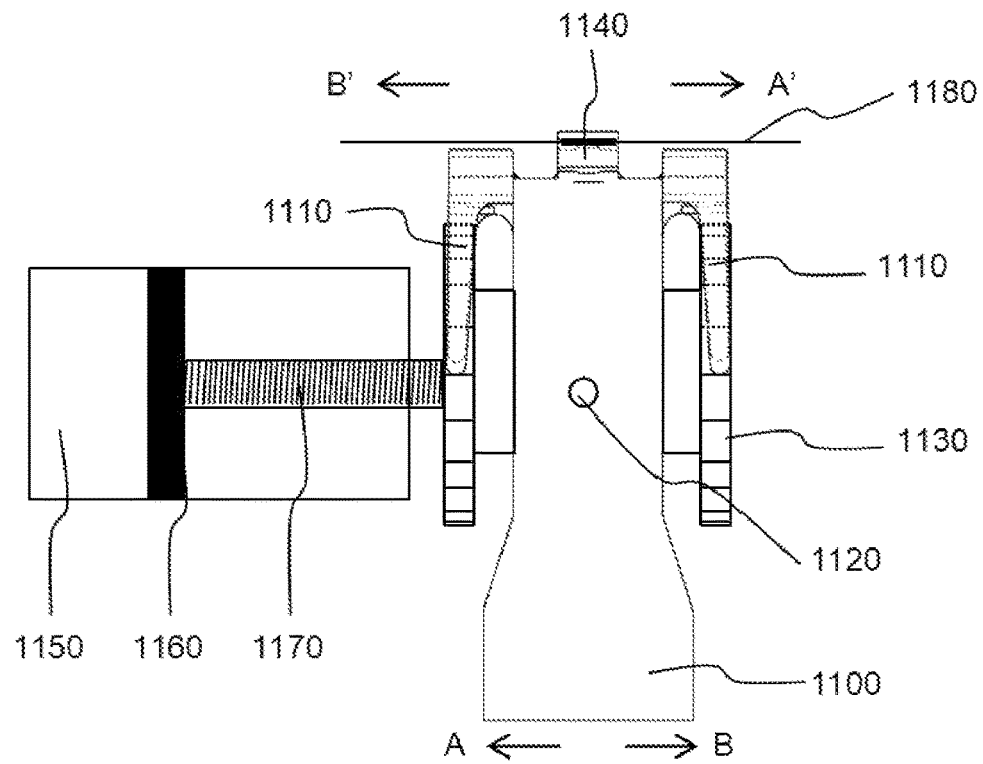
FIG. 2a-FIG. 2b are schematic views showing the structure of the drug infusion unit according to an embodiment of the present invention.
Figure 2B:
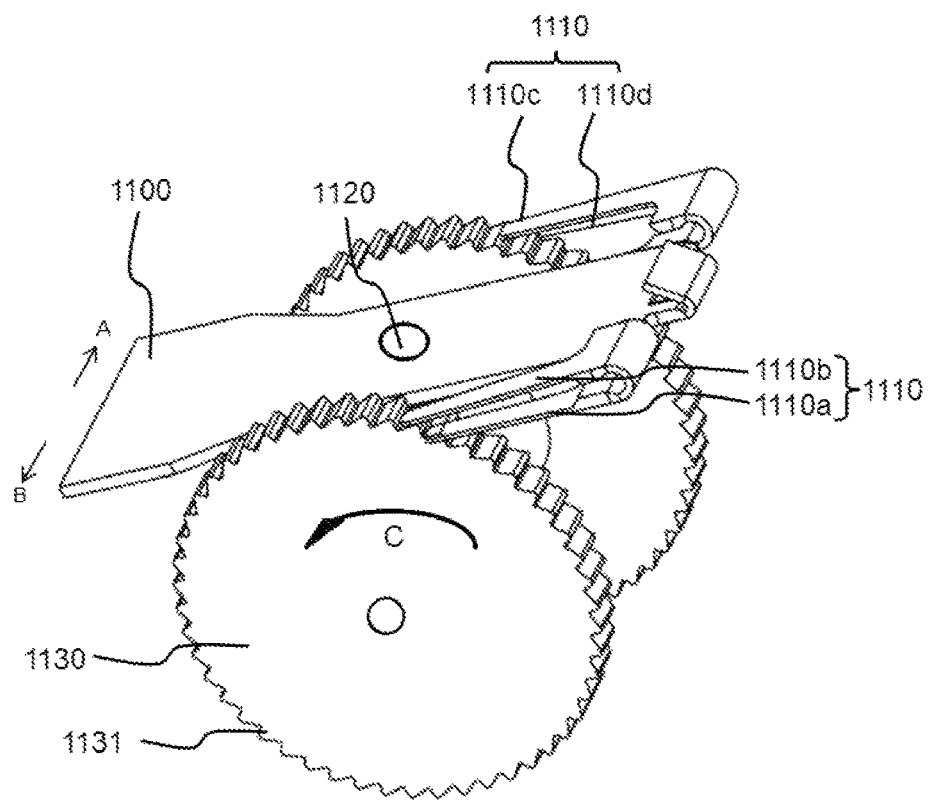

FIG. 2*a* is a schematic view showing the structure of the infusion unit according to an embodiment of the present invention. The infusion unit includes a driving unit 1100, a driving wheel 1130, a drug storage unit 1150, a piston 1160, a screw 1170, and a power unit 1180. FIG. 2*b* is a schematic view of the cooperation between the driving unit 1100 and the driving wheel 1130 according to an embodiment of the present invention.

The screw 1170 is connected to the piston 1160 and the driving wheel 1130, respectively. In the embodiment of the present invention, the driving wheel 1130 is movably mounted on the device base (not shown), and the driving wheel 1130 moves the driving screw 1170 through rotation to advance the piston 1160 disposed in the drug storage unit 1150 to move forward for the purpose of injecting drugs.

The driving unit 1100 is used to drive the driving wheel 1130 to rotate. The driving unit 1100 is movably connected to the device base through the pivot shaft 1120. The power unit 1180 is used to apply a force to the driving unit 1100 leading the driving unit 1100 to pivot. In the embodiment of the present invention, the power unit 1180 is fixedly connected at the top position 1140 of the driving unit 1100, thereby dividing the power unit 1180 into two left and right portions, such as the A' direction portion and the B' direction portion in FIG. 2*a*. The driving unit 1100 is alternately led to pivot in the A' direction or the B' direction through the pivot shaft 1120. Specifically, in the embodiment of the present invention, when the power unit 1180 leads the driving unit 1100 to A' direction, the driving unit 1100 pivots in the A direction through the pivot shaft 1120, while the power unit 1180 leads the driving unit 1100 to the B' direction, the driving unit 1100 pivots in the B direction through the pivot shaft 1120. By alternately leading the driving unit 1100 to the A' direction and the B' direction, the driving unit 1100 can be alternately pivoted through the pivot shaft 1120 in two different directions, like the A direction and the B direction.

Specifically, in the embodiment of the present invention, the power unit 1180 is made of shape memory alloy. The A' direction portion and the B' direction portion of the shape memory alloy are alternately powered on and off, and a leading force is applied to the driving unit 1100 by a change in the length of the power unit 1180 thereof. The power unit 1180 may be composed of one piece of shape memory alloy, or may be composed of left and right segments (such as the A' direction segment and the B' direction segment) of shape memory alloy, and is not specifically limited herein, as long as the force can be applied to lead the driving unit 1100 to pivot.

Here, it should be noted that the power unit 1180 includes, but is not limited to, a shape memory alloy. In other embodiments of the present invention, the power unit 1180 may also be other structures, and the location where the power unit 1180 applies force to the driving unit 1100 is also not limited to the top position 1140, as long as the action of applying a force to the driving unit 1100 can be satisfied to cause the driving unit 1100 to alternately pivot left and right.

As shown in FIG. 2*a* and FIG. 2*b*, the driving wheel 1130 includes a plurality of sub-wheels, and the circumferential surface of the sub-wheels is provided with wheel teeth 1131. Driving unit 1100, through the wheel teeth 1131, cooperates with the driving wheel 1130.

In the embodiment of the present invention, a plurality of driving portions 1110 are installed on each side of the driving unit 1100. Therefore, a plurality of sub-wheels are also installed on both sides of the driving unit 1100 to cooperate with the driving portions 1110. Specifically, in the embodiment of the present invention, the driving unit 1100 includes four driving portions 1110, which are 1110*a*, 1110*b*, 1110*c*, and 1110*d*, respectively. 1110*a*, 1110*b* are installed on one side of the driving unit 1100, while 1110*c*, 1110*d* are installed on the other side of the driving unit 1100. The driving wheel 1130 includes two sub-wheels, one of which cooperates with 1110*a*, 1110*b* and the other of which cooperates with 1110*c*, 1110*d*.

Figure 3A:
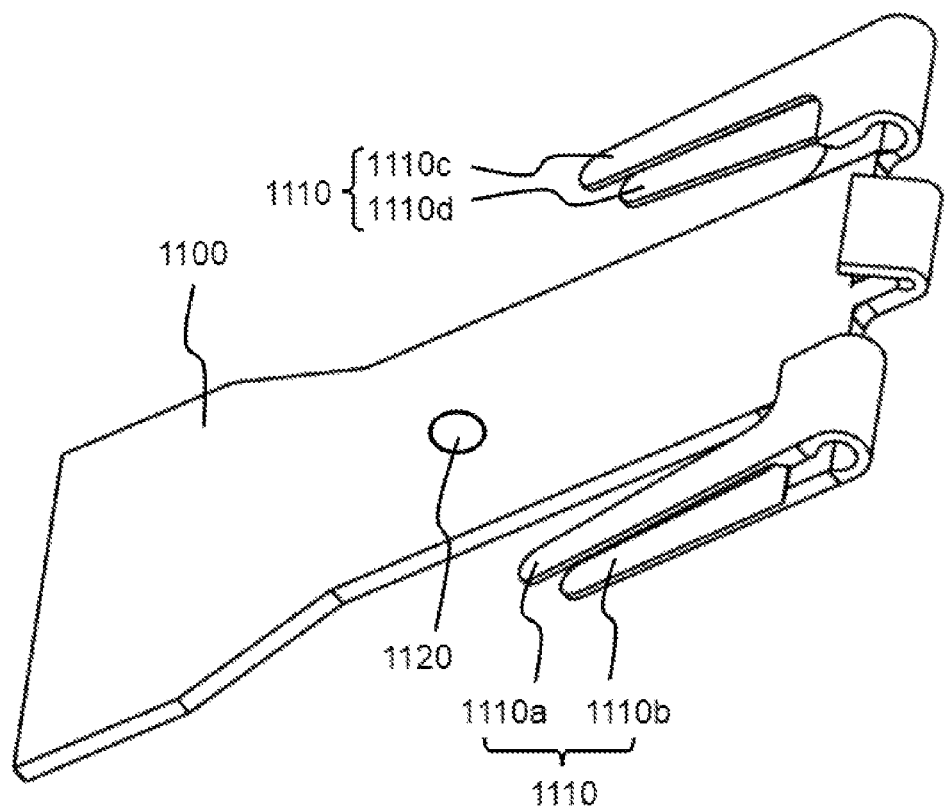
FIG. 3a is a schematic view of the driving unit according to an embodiment of the present invention.
Figure 3B:
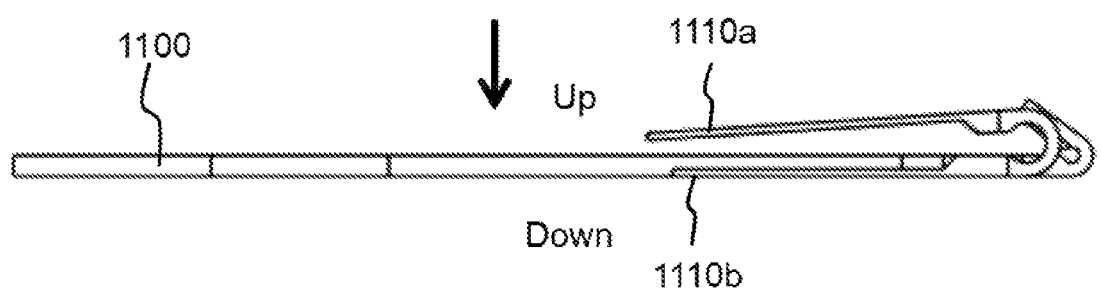

FIG. 3*a* and FIG. 3*b* are respectively schematic view, a side view of the driving unit 1100.

In the embodiment of the present invention, the two driving portions 1110 on one side of the driving unit 1100 are installed up and down. Here, the up and down settings refer to the up and down positional relationship representations shown in FIG. 3*b*. Specifically, the two driving portions 1110 (such as 1110*a* and 1110*b*) on the side of the driving unit 1100 can be seen in the side view FIG. 3*b*, and 1110*b* and 1110*d* are blocked by 1110*a* and 1110*c*, respectively.

It should be noted that, in other embodiments of the present invention, these four driving portions may be disposed by other means, such as the two driving portions on one side of the driving unit are disposed left and right, as long as the arms are able to drive the driving wheel to rotate, and is not specifically limited herein.

Figure 4:
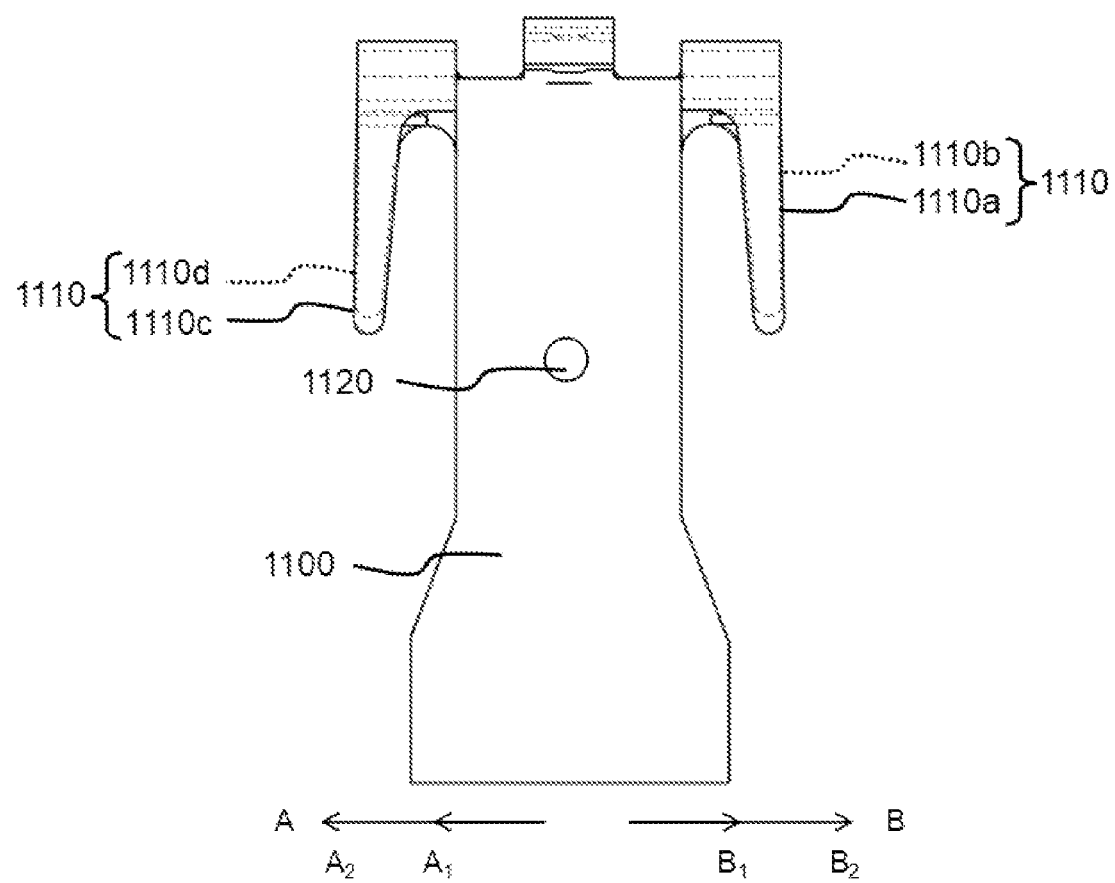
FIG. 4 is a schematic view of a position structure of multiple pivot amplitudes of the driving unit according to an embodiment of the present invention.

FIG. 4 is a schematic view of a position structure of a plurality of pivot amplitudes of the driving unit 1100, and is also a top view in the direction of the arrow in FIG. 3*b*.

In a single pivot in the direction A, driving portion 1110*a* and/or 1110*b* engage the wheel teeth 1131 to rotate the driving wheel 1130, while 1110*c* and 1110*d* can slide on the wheel teeth 1131, but not exert a force for driving the driving wheel 1130 to rotate. And obviously, 1110*c* slides to the next adjacent driving position firstly. At this time, the driving unit 1100 stops pivoting and the driving portions 1110*a* and/or 1110*b* stop engaging the wheel teeth 1131, therefore, the driving wheel 1130 stops rotating. Thus, the driving unit 1100 completes one kind of pivot amplitude. At this time, the driving unit 1100 pivots in the A direction to reach $A_1$ position. The next moment the driving unit 1100 continues to pivot in the A direction, 1110*d* will slide to the next adjacent driving position. Similarly, the driving unit 1100 completes another kind of pivot amplitude. At this time, the driving unit 1100 still pivots in the A direction to reach $A_2$ position. And the driving unit 1100 completes the whole process of single pivot in the A direction, performing $A_1$ and $A_2$ two pivot amplitudes, respectively, thereby driving the driving wheel 1130 to rotate by two steps, realizing two kinds of infusion modes of the medical device.

It should be noted that, in the above pivoting process, the driving portion 1110*d* may firstly slide to the next gear tooth 1131, and then 1110*c* slides to the next gear tooth 1131, which is not specifically limited herein. Similarly, when the driving unit 1100 pivots in the B direction, it can perform $B_1$ and $B_2$ two pivot amplitudes, respectively.

Obviously, in the whole process of the above-mentioned single pivot in the A direction, the driving unit 1100 undergoes an alternate action of pivot and stop, and the driving portions 1110 alternately engage and stop engaging wheel teeth 1131 to drive the driving wheel 1130 to rotate and stop rotating, realizing two-step rotation of the driving wheel, and finally achieving two infusion modes of the medical device.

Referring to FIG. 4 again, in another embodiment of the present invention, the driving unit 1100 pivots to the $A_1$ position, and then pivots one or two amplitudes in the B direction, that is, reaching the $B_1$ or $B_2$ position until the pivot in the B direction stops. This process completes the alternate pivot of the driving unit 1100 in two directions, so that the driving wheel 1130 can be rotated in multiple steps. Therefore, in the embodiment of the present invention, the driving unit 1100 can alternately switch amplitudes among $A_1$-$B_1$, or $A_1$-$B_1$-$B_2$, or $B_1$-$A_1$-$A_2$, so as to achieve the purpose of switching among different infusion modes.

Referring to FIG. 4 again, in another embodiment of the present invention, the driving unit 1100 can also be pivoted directly to the $A_2$ position without passing through the $A_1$ position, then directly pivoted to the $B_2$ position without passing through the $B_1$ position, that is, the driving unit 1100 alternately pivots between the $A_2$-$B_2$ positions. As described above, the driving unit 1100 can also alternately pivot between the $A_1$-$B_1$ positions.

As with the medical device of the embodiment of the present invention, when the infusion is started, the amount of drug required is relatively large, and the patient or the closed-loop system can select the large $A_2$-$B_2$ pivot amplitude for infusion. After a period of time, the intermediate $A_1$-$B_1$-$B_2$ pivot amplitude or $B_1$-$A_1$-$A_2$ pivot amplitude can be used to reduce the rate of drug infusion. When the drug infusion is about to be completed, the patient or the closed-loop system can switch to the small $A_1$-$B_1$ pivot amplitude to further reduce the infusion rate and achieve precise control of the drug infusion. Of course, the patient or the system can also choose one or several of the modes for infusion, and there are no specific restrictions.

It should be noted that in another embodiment of the present invention, further more driving portions, like three, four, etc., can be disposed on one side of the driving unit. And the total number of driving portions may also be an odd number, such as three, five or more, that is, the numbers of driving portions on both sides of the driving unit are not equal. Moreover, the structural relationship between the different driving portions can be similar to that described above, and no specific restrictions are imposed herein.

Figure 5A:
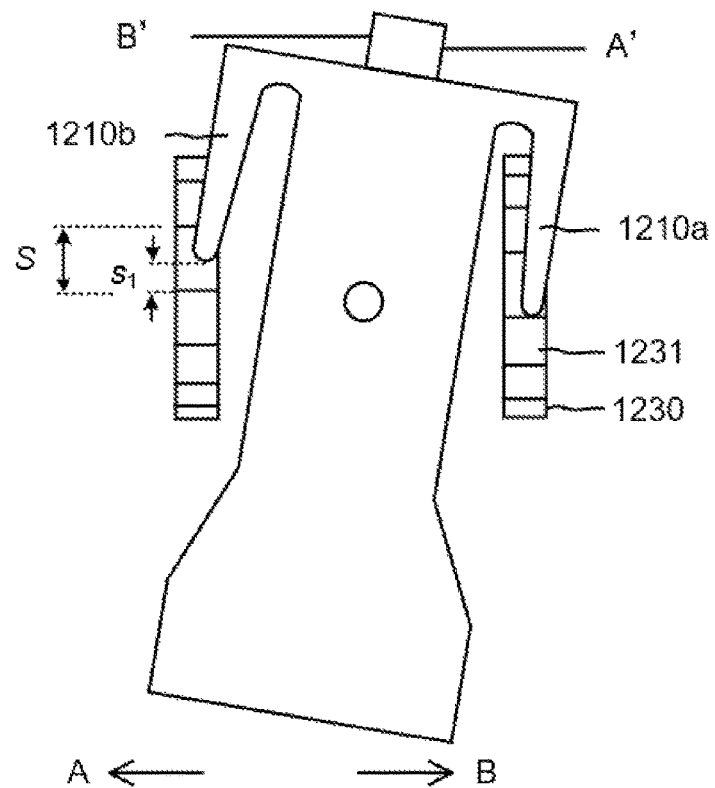
FIG. 5a-FIG. 5b are schematic views of the driving unit including two driving portions according to another embodiment of the present invention.
Figure 5B:
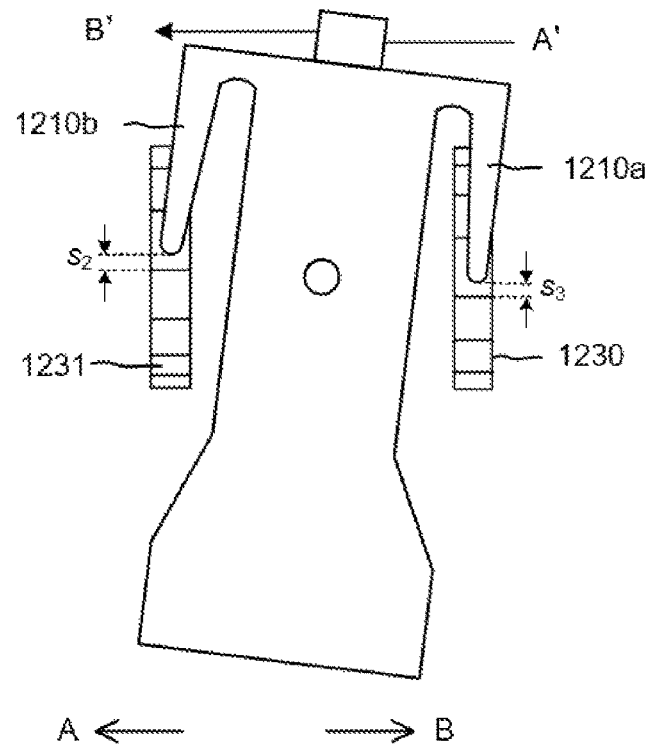

FIG. 5*a*-FIG. 5*b* are schematic views of the driving unit 1200 including two driving portions.

When the driving portion 1210*a* or 1210*b* reaches a different position, the driving unit 1200 can still continue to rotate in the direction A or B to move the driving portion away from the driving position. If the distance of the driving portion 1210*a* away from the driving position is $s_1$, if the tooth pitch is S, then $s_1$=⅓S, ½S, ¾S, or S. Therefore, during the pivot of the driving unit 1200, at a certain moment, neither of the driving portions 1210*a* and 1210*b* push the gear teeth 1231, for example, the front end of the driving portion and the driving position are separated by $s_2$ and $s_3$, respectively. At this time, the driving wheel 1230 does not rotate, nor does the medical device perform drug infusion. According to this working principle, the driving unit 1200 will pivot at any different amplitude, and the medical device has a variety of different infusion modes.

In the embodiments of the present invention, the frequency of the force output by the power unit can be changed to further change the pivot frequency of the driving unit, so that the medical device has a variety of different infusion rates. The user or the closed-loop system can flexibly select the appropriate infusion rate as needed, making the infusion process flexible and controllable.

Figure 6A:
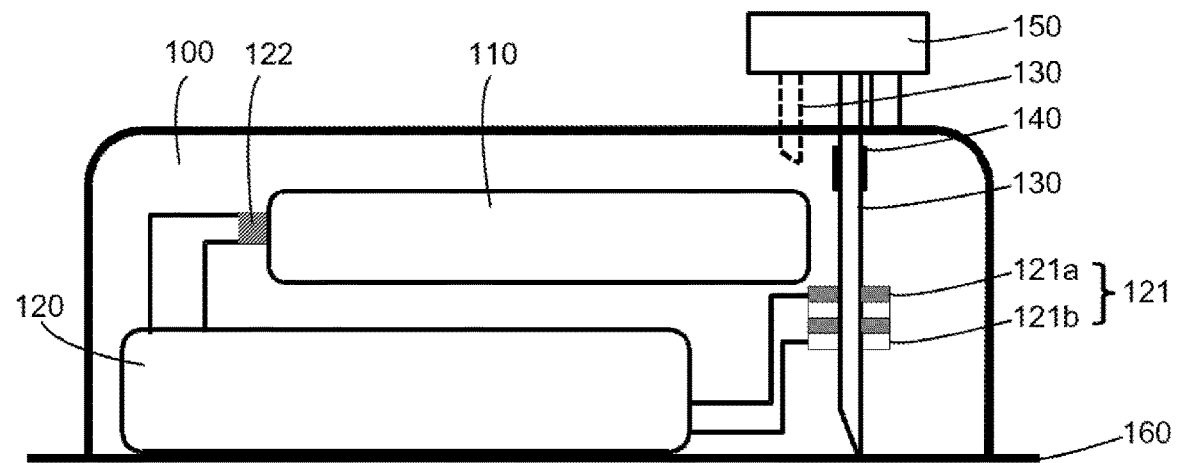
FIG. 6a is a schematic view of an infusion cannula of a bilateral-driven medical device with infusion and detection integrated in a pre-installation position according to one embodiment of the present invention.
Figure 6B:
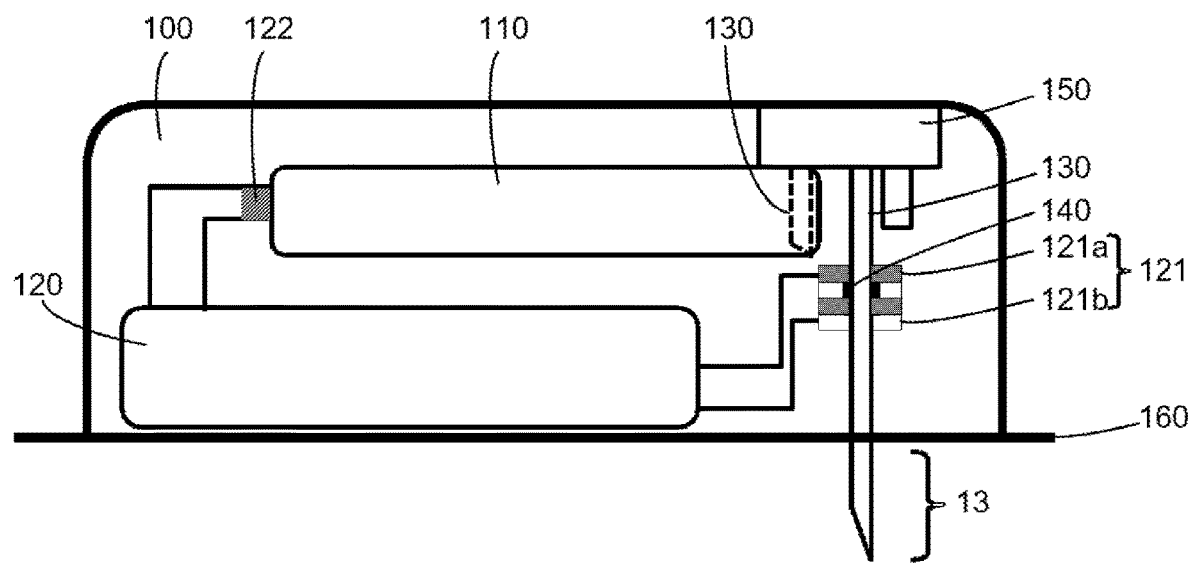
FIG. 6b is a schematic view showing the infusion cannula of the bilateral-driven medical device with infusion and detection integrated in a working position according to an embodiment of the present invention.

FIG. 6*a*-FIG. 6*b* are views of a medical device 100 according to an embodiment of the present invention, and the medical device 100 is an integral structure. FIG. 6*a* shows the infusion cannula 130 in the pre-installation position while FIG. 6*b* shows the infusion cannula 130 in the working position.

Program unit 120 includes an input end 121 and an output end 122. The input end 121 is used for receiving a body fluid analyte data signal. In the embodiment of the invention, the input end 121 includes electrically connective regions 121*a* and 121*b*. When in operation, the electrically connective region is electrically connected to the electrode or electrode lead to receive the analyte signal. In other embodiments of the invention, the input end 121 may also include more electrically connective regions depending on the number of electrodes. The output end 122 is electrically coupled to the power unit 1180, allowing the program unit 120 to effectively control the drug infusion unit 110.

During the use of the bilateral-driven medical device with infusion and detection integrated of the embodiment of the present invention, the infusion cannula 130 can slid relative to the input end 121, while the input end 121 is provided as an elastic member. The elastic member is to ensure an interference fit between the infusion cannula 130 and the input end 121 to avoid poor electrical contact. The elastic member includes: conductive rubber strip, oriented conductive silica gel, conductive ring, conductive ball, etc. When the number of electrodes is relatively large, the electrically connective regions are relatively dense. In this case, according to different structural designs, the elastic members may be one or more combinations of the above.

In an embodiment of the invention, the infusion cannula 130 is mounted on the mounting unit 150. When the infusion cannula 130 is in the pre-installation position, the mounting unit 150 protrudes from the outer surface of the medical device 100, as shown in FIG. 6*a*. When the infusion cannula 130 is installed to the working position, the mounting unit 150 is pressed into the medical device 100 with the top portion integral with the medical device 100 housing, as shown in FIG. 6*b*. Prior to use by users, the mounting unit 150 holds the infusion cannula 130 in the pre-installation position. After the medical device 100 is attached on the surface of the human body, the mounting unit 150 is pressed to insert the infusion cannula under the skin, and the bilateral-driven medical device with infusion and detection integrated can start operation. Compared with other infusion cannula installation methods, the installation method of the embodiment of the invention reduces the steps required for installation, makes the installation more convenient and flexible and improves the user experience.

The manner of setting the infusion cannula 130 in the mounting unit 150 can be various, and is not specifically limited herein. Specifically, in the embodiment of the present invention, the other side of the mounting unit 150 also protrudes from the partial infusion cannula 130 (shown by a dotted line in FIG. 6*a* and FIG. 6*b*) for subsequent connection with the outlet of the drug infusion unit 110 to achieve drug circulation.

In other embodiments of the invention, the infusion cannula 130 further includes an electrical contact region 140 coupled to the input end 121. As shown in FIG. 6*a*, the electrical contact region 140 is not electrically coupled to the input end 121 when the infusion cannula 130 is in the pre-installation position. And the other end of the infusion cannula 130 is also not connected with the drug infusion unit 110 outlet. As shown in FIG. 6*b*, when the infusion cannula 130 is mounted to the working position, one end of the infusion cannula 130 is inserted subcutaneously (indicated by the solid line portion of the infusion cannula in FIG. 6*b*) and the other end (illustrated by the dotted portion of the infusion cannula in FIG. 6*b*) is connected with the outlet of the drug infusion unit 110, thereby establishing a flow path for the drug from the drug infusion unit 110 to the body tissue fluid. At the same time, the electrical contact region 140 reaches the electrically connective region of the input end 121, enabling electrical connection between the program unit 120 and the electrical contact region 140.

It should be noted that even if the infusion cannula 130 and the drug infusion unit 110 are connected, and the input end 121 and the electrical contact region 140 of the infusion cannula 130 are electrically connected, as long as the infusion cannula 130 does not penetrate the skin, the program unit 120 will not enter working mode, so that the bilateral-driven medical device with infusion and detection integrated does not generate any analyte data signal, nor does it issue an instruction to inject drug. Therefore, in other embodiments of the present invention, when the infusion cannula 130 is in the pre-installation position, the electrical contact region 140 may also be electrically connected to the electrically connective region of the input end 121 or the infusion cannula 130 may be coupled to the outlet of the drug infusion unit 110. And there are no specific restrictions herein.

In an embodiment of the invention, a medical tape 160 for attaching the medical device 100 to the skin surface is used to paste the program unit 120, the drug infusion unit 110, the electrode and the infusion cannula 130 as a whole on the skin. When the infusion cannula 130 is installed to the working position, the portion of the infusion cannula 130 that is inserted into the skin is 13.

Figure 7A:
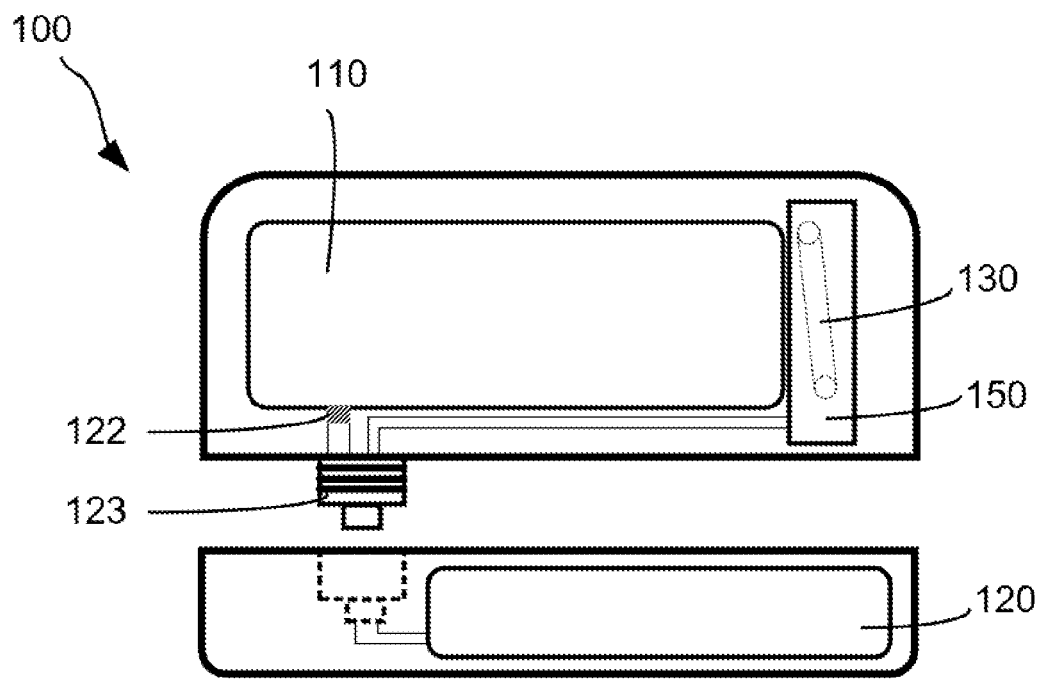
FIG. 7a-FIG. 7b are top views of a bilateral-driven medical device with infusion and detection integrated in accordance with another embodiment of the present invention.

FIG. 7*a* is a top view of a medical device 100 in accordance with another embodiment of the present invention.

In one embodiment of the invention, the medical device 100 comprises two parts. The program unit 120 is disposed in one part, the drug infusion unit 110 is disposed in another part, and the two parts are electrically connected by the waterproof electrical plug 123. The part of the drug infusion unit 110 can be discarded after being used once, and the part of the program unit 120 can be reused, saving the user's cost.

In other embodiments of the present invention, the medical device 100 may also be composed of more parts, and parts that do not require electrical connection may be connected using a common waterproof plug.

Figure 7B:
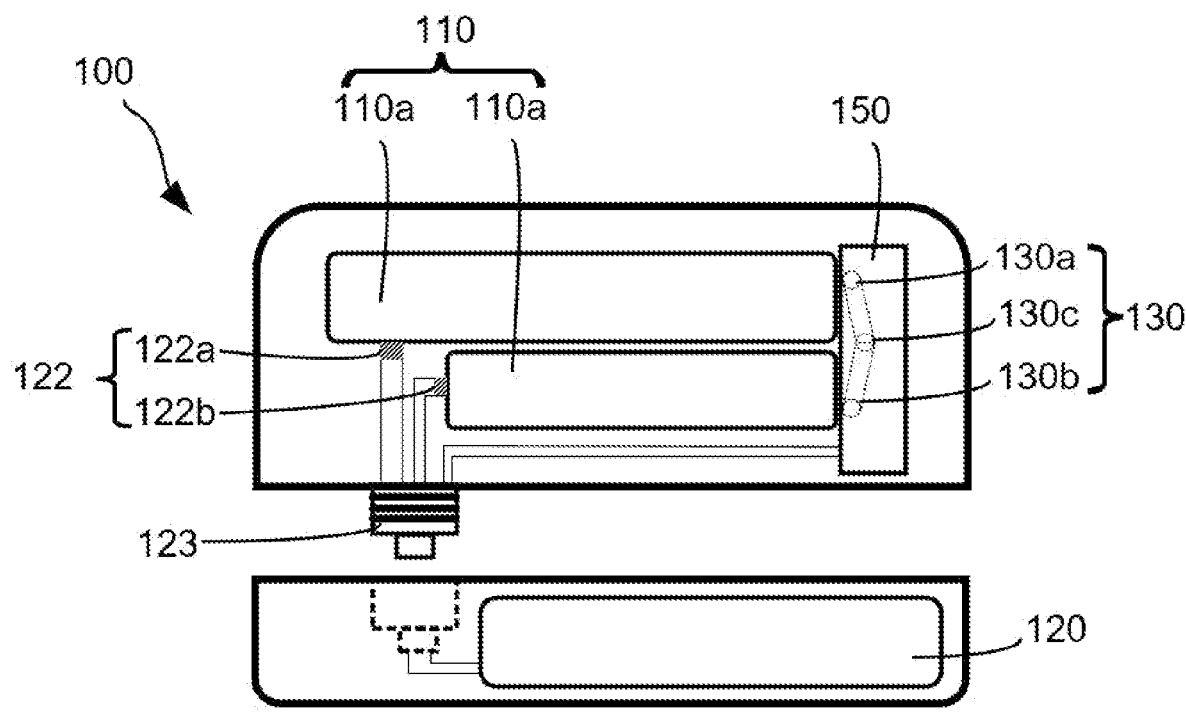

FIG. 7*b* is a top view of a medical device 100 in accordance with another embodiment of the present invention.

In an embodiment of the invention, the medical device 100 comprises two parts, and the drug infusion unit 110 comprises two infusion subunits 110*a* and 110*b*. The infusion subunits 110*a* and 110*b* can be used to reserve different drugs such as insulin, glucagon, antibiotics, nutrient solution, analgesics, morphine, anticoagulants, gene therapy drugs, cardiovascular drugs or chemotherapeutic drugs, etc. Infusion subunits 110*a* and 110*b* are electrically coupled to outputs 122*a* and 122*b*, respectively, allowing the program unit 120 to effectively control the drug infusion unit 110. The outlets of infusion subunits 110*a* and 110*b* can be connected with the 130*a* portion and 130*b* portion of infusion cannula respectively. 130*a* and 130*b* are connected with the 130*c* portion of infusion cannula, respectively. The 130*c* portion of the infusion cannula is used to penetrate the skin, thereby establishing a path for the two drugs to flow from the drug infusion unit 110 into the body fluid. That is, the infusion device still penetrates the skin only in one position. In the embodiment of the present invention, after the body fluid analyte data signal is transmitted to the program unit 120, program unit 120 can output different infusion signals to different infusion subunits to control whether infusion of drug is required. This method realizes accurate detection and control of body fluid analyte level to stabilize the physiological state of the user.

In other embodiments of the present invention, there may be more infusion subunits according to actual needs, and multiple infusion subunits may be disposed in different parts of the medical device 100. There are no specific restrictions herein.

Figure 8A:
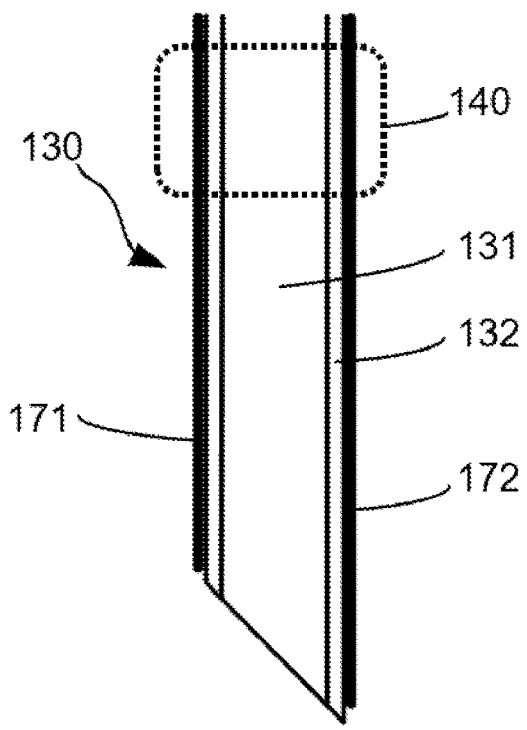
FIG. 8a-FIG. 8b are partial longitudinal views of an infusion cannula including two electrodes according to one embodiment of the present invention.
Figure 8B:
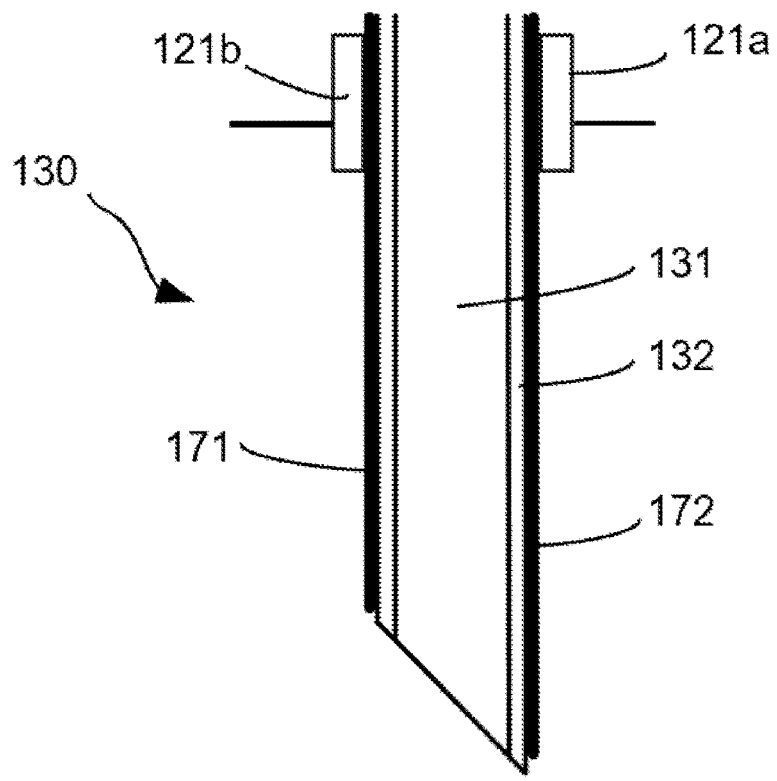

FIG. 8a-FIG. 8b are partial longitudinal views of the infusion cannula 130 including two electrodes.

In the embodiment of the invention, the medical device 100 includes at least two detecting electrodes that are disposed on the wall of the infusion cannula 130, as shown in FIG. 8a. The different electrodes are electrically connected to the electrically connective regions at the position of the dotted frame 140. The cavity 131 of the infusion cannula 130 is used for drug infusion.

In the embodiment of the present invention, the electrodes, such as electrode 171 and electrode 172, are plated on the outer surface of the cannula wall of the infusion cannula 130. The electrode 171 and the electrode 172, electrically insulated from each other, are directly electrically connected to the electrically connective regions 121a and 121b of the input end, respectively, which allows electrical signals of the body fluid analyte data to be transmitted to program unit 120, as shown in FIG. 8b. Once the puncture is performed at one position, the analyte detection and the drug infusion can be completed simultaneously, reducing the risk of the user's infection.

It should be noted that, in the embodiment of the present invention, when the infusion cannula 130 is mounted to the working position, a part of the electrode 171 or the electrode 172 is located in the subcutaneous tissue fluid, while another part is located above the skin, so that electrical signals can be transmitted on the electrode. The corresponding electrode arrangements in the other embodiments below have the same function and will not be described in detail later.

In the embodiment of the present invention, the medical device 100 has only two electrodes, the electrode 171 is a working electrode while the electrode 172 is an auxiliary electrode. In another embodiment of the invention, the electrode 171 is an auxiliary electrode while the electrode 172 is a working electrode. The auxiliary electrode is a counter electrode.

In other embodiments of the present invention, more electrodes, which are electrically insulated from each other, may be provided on the surface of the infusion cannula 130.

Figure 9A:
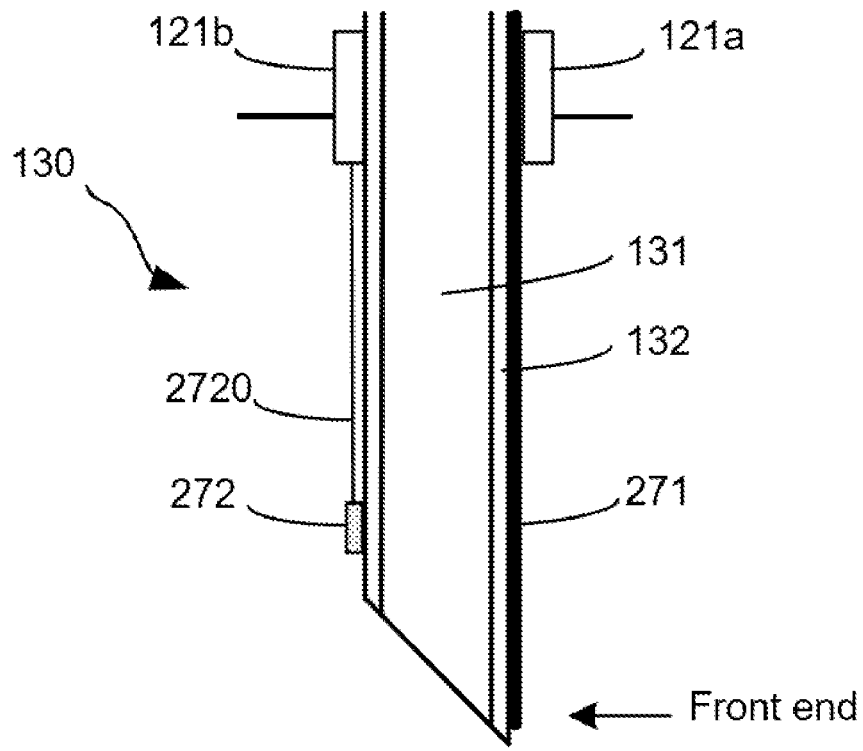
FIG. 9a-FIG. 9c are partial longitudinal views of an infusion cannula and the two electrodes in accordance with another embodiment of the present invention.
Figure 9B:
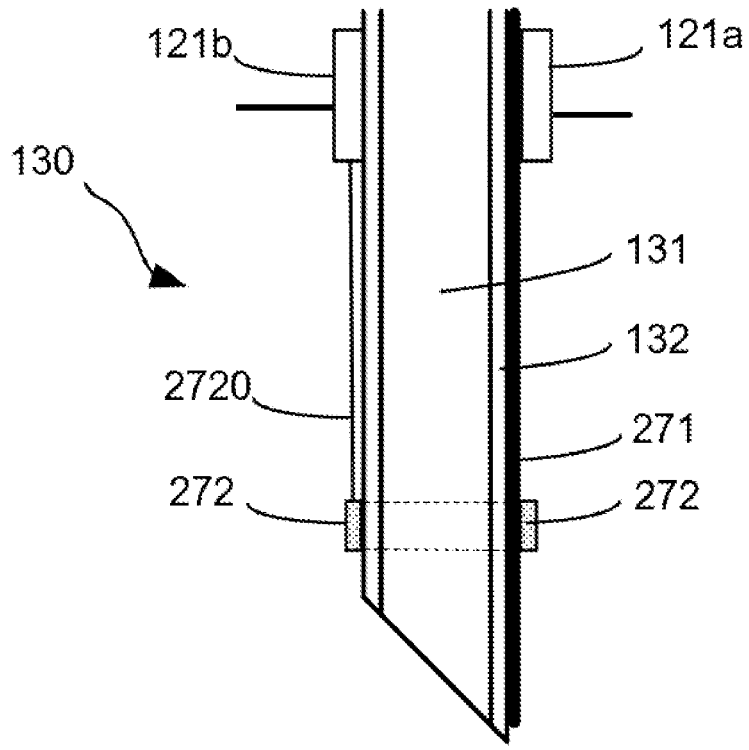
Figure 9C:
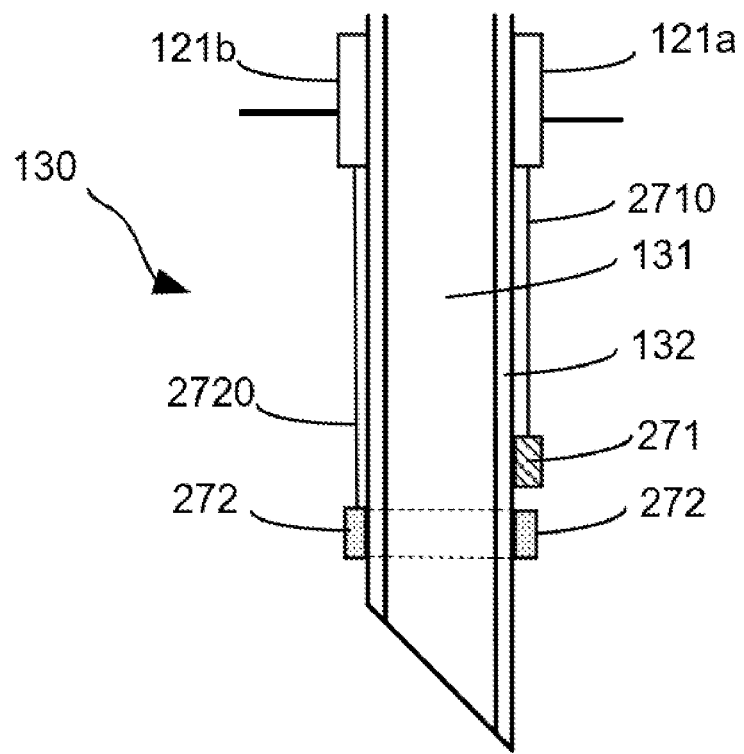

FIG. 9a-FIG. 9c are partial longitudinal views of an infusion cannula 130 in accordance with another embodiment of the present invention.

It should be noted that the electrodes or electrode leads in all embodiments of the present invention are coated or plated on the infusion cannula 130, but for ease of marking and description, the electrode leads or electrodes and the infusion cannula will be depicted separately in the FIG. 8b. The following related structural views are the same as those here, which will not be described in detail below.

In this embodiment, the cannula wall 132 of the infusion cannula 130 provides with the electrode 271 and the electrode 272. And the electrode 271 is directly electrically connected to the electrically connective regions 121a, such as the electrode 171 in FIG. 8a. The electrode 272 is disposed at the front end of the infusion cannula 130. And an electrode lead 2720 is used to electrically connect to the electrode 272 and the electrically connective regions 121b.

When the infusion cannula 130 is mounted to the working position, the electrode 272 is located on the subcutaneous part of the outer surface of the cannula wall 132, while a part of the electrode 272 is located in the subcutaneous tissue fluid and another part is located above the skin. At this time, the electrode 272 is indirectly electrically connected to the electrically connective regions 121b, sending parameter information to the program unit.

The embodiment of the present invention does not specifically limit the shape of the electrode 272. If the electrode 272 may be ring-shaped, the electrode 272 surrounds the front end of the infusion cannula 130, as shown in FIG. 9b. At this time, an insulation layer is provided between the electrode 272 and the electrode 271. As shown in FIG. 9c, in yet another embodiment of the present invention, the electrode 271 and the electrode 272 are both provided at the front end of the infusion cannula 130, that is, on the subcutaneous part of the outer surface of the cannula wall. The outer surface of the cannula wall 132 is also provided with an electrode lead 2710 and an electrode lead 2720 that are electrically connected to the electrode 271 and the electrode 272, respectively. When the infusion cannula 130 is installed to the working position, the electrically connective regions 121a and 121b at the input end are electrically connected to the electrode lead 2710 and the electrode lead 2720, respectively. Therefore, the electrode 271 and the electrode 272 are indirectly electrically connected to the input end, transmitting the body fluid parameter signal to the program unit. During detection, both the electrode 271 and the electrode 272 are located in the subcutaneous tissue fluid.

As shown in FIG. 9c, the electrode 272 is arranged in a ring shape surrounding a part of the outer surface of the cannula wall 132. The electrode 271 and the electrode 272 may have other shapes, which is not specifically limited herein.

Figure 10:
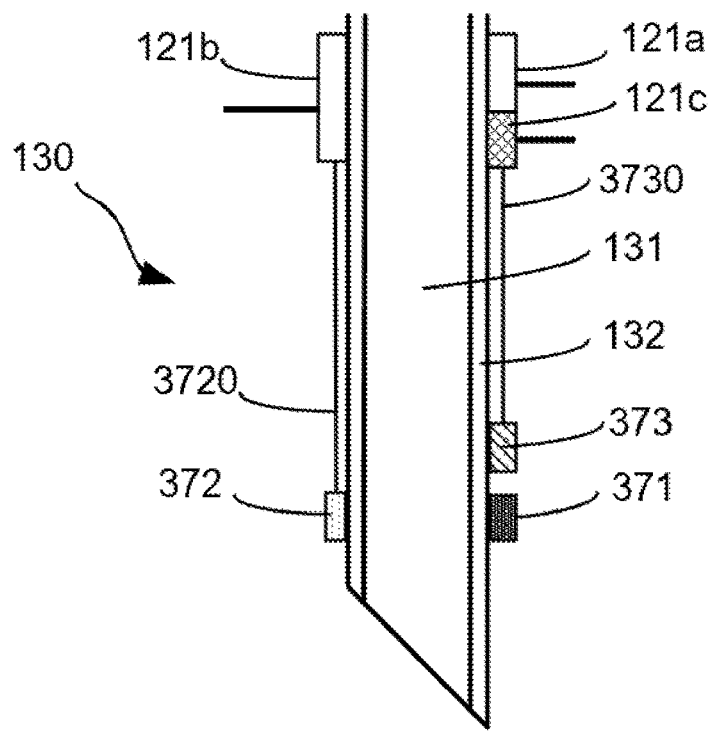
FIG. 10 is a partial longitudinal view of an infusion cannula provided with three electrodes in accordance with still another embodiment of the present invention.

FIG. 10 is a partial longitudinal view of an infusion cannula 130 provided with three electrodes in accordance with yet another embodiment of the present invention.

In the embodiment of the present invention, three electrodes are disposed on the infusion cannula 130: the electrode 371, 372 and 373 which are all disposed on the outer surface of the cannula wall 132. Similarly, the surface of the cannula wall 132 is also provided with electrode leads 3720 and 3730 which are electrically connected to the electrode 372 and the electrode 373, respectively. Similarly, the outer surface of the cannula wall 132 is also provided with an electrode lead electrically connected to the electrode 371, but it is not shown in order to simplify the marking. When the infusion cannula 130 is installed to the working position, the electrode lead of the electrode 371, electrode lead 3720 and electrode lead 3730 are electrically connected to the electrically connective regions 121a, 121b, and 121c of the input end, respectively, connecting the input end to each electrode. The shapes of the three electrodes can be various, and there is no specific limitation herein.

In the embodiment of the present invention, in order to simplify the design of the electrically connective region, the elastic member at the input end is an oriented conductive silica gel or a conductive ring. By doping different elements in the silica gel, it is possible to achieve directional conduction, such as horizontal conduction or vertical conductivity. Thus, even if 121a and 121c are adjacent to each other, the two can still be electrically insulated from each other. The electrically connective region 121b may be a conductive rubber strip or a conductive ball or the like, and is not specifically limited herein.

In the embodiment of the present invention, the electrode 371 is a working electrode, and the electrode 372 and the electrode 373 are both auxiliary electrodes. At this time, the electrode 371 and the electrode 372 or the electrode 373 may constitute a different electrode combination, that is, the two electrode combinations share the electrode 371. The program unit 120 can select different electrode combinations to detect body fluid analyte data. After the electrode combination is formed, on the one hand, when a working electrode combination fails to detect, the program unit 120 can select other electrode combinations for detection according to the situation to ensure that the detection process of the body fluid signal is uninterrupted. On the other hand, the program unit 120 can select a plurality of electrode combinations to work simultaneously, perform statistical analysis on multiple sets of data of the same parameter at the same time, improve the accuracy of the analyte data, and thereby output a more accurate drug infusion signal.

In another embodiment of the present invention, the electrode 371, electrode 372, and electrode 373 include an auxiliary electrode and two working electrodes, which can also be arbitrarily selected according to actual needs, which are not specifically limited herein.

As an embodiment of the present invention, the electrode 371 is a working electrode, the electrodes 372 and 373 are auxiliary electrodes which are used as a counter electrode and a reference electrode, respectively, thereby forming a three-electrode system. Similarly, the three electrodes can be arbitrarily selected according to actual needs, which are not specifically limited herein.

Also, in other embodiments of the invention, more electrodes may be provided. The system includes a plurality of working electrodes and a plurality of auxiliary electrodes. At this time, each electrode combination includes at least a working electrode and an auxiliary electrode, and thus a plurality of electrodes may constitute a plurality of electrode combinations. The program unit 120 may select one or more electrode combinations to detect body fluid analyte data, as desired.

Figure 11:
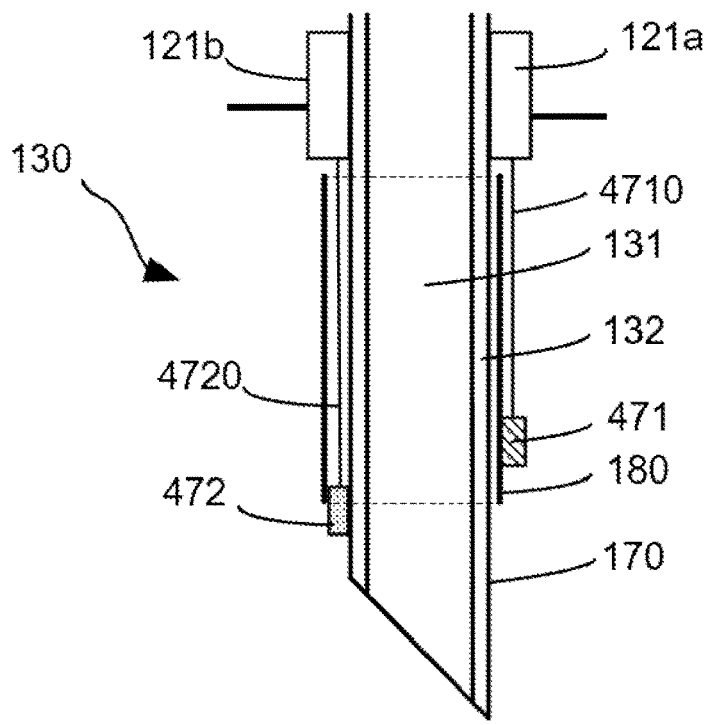
FIG. 11 is a partial longitudinal view of an infusion cannula 130 including an inner layer cannula 170 and one outer layer cannula 180 in accordance with still another embodiment of the present invention.

FIG. 11 is a partial longitudinal view of an infusion cannula 130 including an inner layer cannula 170 and one outer layer cannula 180 in accordance with yet another embodiment of the present invention.

The cavity 131 of the inner layer cannula 170 is used as a drug infusion channel. The cannula wall of the infusion cannula 130 includes the inner layer cannula wall and the outer layer cannula wall. The electrode 472 is disposed outside the cannula wall of the inner layer cannula 170, while the electrode 471 is provided on the outer surface of the wall of the outer layer cannula 180. At this time, the electrode 472 is disposed in the wall of the infusion cannula 130, that is, the electrode 472 is embedded between the outer layer cannula 180 and the inner layer cannula 170.

In the embodiment of the present invention, the electrode 472 may be partially covered by the outer layer cannula 180 (as shown in FIG. 11), or completely covered by the outer layer cannula 180. The electrode 472 is electrically connected to the electrically connective region 121*b* through an electrode lead 4720, while the electrode 471 is electrically connected to the electrically connective region 121*a* through an electrode wire 4710. When the electrode 472 is partially or completely covered by the outer layer cannula 180, the wall material of the outer layer cannula 180 is a permeable membrane or a semi-permeable membrane. Such selection can facilitate the body fluid analyte to pass through the wall of the outer layer cannula 180 and to be detected by the electrode, thereby improving the flexibility of electrode position design without affecting the detection.

In another embodiment of the present invention, the electrode 471 and the electrode 472 are both disposed in the wall of the infusion cannula 130, that is, the electrode 471 and the electrode 472, which are completely covered by the outer layer cannula 180, are both embedded between the inner layer cannula 170 and the outer layer cannula 180. At this time, the material of the outer layer cannula 180 is as described above, which makes analytes detected by the electrode through the outer layer cannula 180.

It should be noted that, in other embodiments of the present invention, more layers of outer layer cannulas may be arranged outside the inner layer cannula 170. And as described above, more electrodes can be provided on the infusion cannula 130. According to actual needs, different electrodes can be arranged between different outer layer cannulas. And at least one electrode is disposed between the wall of the inner layer cannula and the outermost cannula.

In addition to embedding electrodes into the wall of the infusion cannula 130, some embodiments of the present invention can also reduce the length of the outer layer cannula 180 in FIG. 11, directly exposing the electrode 472 disposed on the outer surface of the inner layer cannula 170 in tissue fluid.

In summary, the present invention discloses a bilateral-driven medical device with infusion and detection integrated that has both infusion and detection functions to reduce the number of punctures on the skin. With only one puncture at one position, analyte detection and drug infusion can be completed, reducing the risk of infection.

While the invention has been described in detail with reference to the specific embodiments of the present invention, it should be understood that it will be appreciated by those skilled in the art that the above embodiments may be modified without departing from the scope and spirit of the invention. The scope of the invention is defined by the appended claims.

The invention claimed is:

1. A bilateral-driven medical device with infusion and detection integrated, comprising:
a drug infusion unit, including:
at least one drug storage unit;
a screw connected to a piston and a driving wheel provided with wheel teeth, respectively, the driving wheel drives the screw to move by rotation, pushing the piston, provided in the at least one drug storage unit, forward;
a driving unit cooperating with the driving wheel, the driving unit includes at least two driving portions, the driving unit pivots, around a pivot shaft, in different multiple pivot modes, thus driving the at least two driving portions, in different directions, to push the wheel teeth to rotate the driving wheel;
a power unit connected to the driving unit, the power unit outputs two forces in different directions on the driving unit, making the driving unit have the multiple pivot modes;
a program unit comprising an input end and an output end, and the input end comprises a plurality of electrically connective regions for receiving signals of an analyte data in a body fluid, after the output end is electrically connected to the power unit, according to received signals of the analyte data in the body fluid, the program unit controls the pivot modes of the driving unit to implement whether the drug infusion unit delivers a drug; and an infusion cannula provided with at least two electrodes, the infusion cannula is a drug infusion channel, the at least two electrodes are disposed on a cannula wall, when the infusion cannula is installed to a working position, the infusion cannula is connected with the drug infusion unit, the drug is then capable of being injected into a body through the infusion cannula, and the at least two electrodes are electrically connected to the plurality of electrically connective regions respectively, inputting the signals of the analyte data in the body fluid to the program unit, wherein the infusion cannula includes an inner layer cannula and at least one outer layer cannula, and the at least one outer layer cannula is disposed outside the inner layer cannula, and the inner layer cannula is used for drug infusion, wherein at least one of the at least two electrodes is provided between an outer wall of the inner layer cannula and an outermost one of the at least one outer layer cannula, wherein when the infusion cannula is installed to the working position, an electrode among the at least one of the at least two electrodes located on an outer surface of the cannula wall of the inner layer cannula is covered in part by the at least one outer layer cannula and exposed in part in a subcutaneous tissue fluid, wherein the different multiple pivot modes of the driving unit each includes different multiple pivot amplitudes and different multiple pivot rates, wherein the driving wheel includes at least two sub-wheels, the pivot shaft is disposed between the at least two sub-wheels, the at least two driving portions are respectively provided on each side of the driving unit, and each sub-wheel is cooperated with each driving portion, wherein the at least two driving portions on one side of the driving unit are disposed up and down or left and right, when the driving unit pushes the wheel teeth to rotate the driving wheel, the at least two driving portions on each side of the driving unit respectively push different teeth on the wheel teeth.

2. The bilateral-driven medical device with infusion and detection integrated of claim 1, wherein:

the at least two electrodes are located on the outer surface of the cannula wall, and when the infusion cannula is installed to the working position, the at least two electrodes are directly electrically connected to the plurality of electrically connective regions, respectively.

3. The bilateral-driven medical device with infusion and detection integrated of claim 2, wherein:

the at least two electrodes are located on a subcutaneous part of the outer surface of the cannula wall, and the outer surface of the cannula wall is further provided with electrode leads electrically connected to the at least two electrodes, and when the infusion cannula is installed to the working position, the electrode leads are electrically connected to the plurality of electrically connective regions, respectively.

4. The bilateral-driven medical device with infusion and detection integrated of claim 1, wherein:

the electrode among the at least one of the at least two electrodes located on the outer surface of the cannula wall of the inner layer cannula is covered in part by the at least one outer layer cannula and configured to be exposed in part in the subcutaneous tissue fluid, and a material of the at least one outer layer cannula walls is a permeable membrane or a semi-permeable membrane.

5. The bilateral-driven medical device with infusion and detection integrated of claim 1, wherein:

the at least two electrodes include a working electrode and an auxiliary electrode, and the number of the working electrode and the auxiliary electrode is one or more, respectively.

6. The bilateral-driven medical device with infusion and detection integrated of claim 5, wherein:

the auxiliary electrode is a counter electrode, or the auxiliary electrode includes the counter electrode and a reference electrode.

7. The bilateral-driven medical device with infusion and detection integrated of claim 6, wherein:

the at least two or more electrodes form one or more electrode combination, each electrode combination comprising the working electrode and the auxiliary electrode, the program unit choosing the one or more electrode combination to detect the analyte data in the body fluid.

8. The bilateral-driven medical device with infusion and detection integrated of claim 1, wherein:

the input end is an elastic member, and the elastic member comprises one of or a combination of a conductive strip, an oriented conductive silica gel, a conductive ring and a conductive ball.

9. The bilateral-driven medical device with infusion and detection integrated of claim 1, wherein:

the drug infusion unit includes a plurality of infusion subunits, the program unit has a plurality of output ends, the plurality of infusion subunits being electrically connected to the plurality of output ends, respectively, and the program unit controlling whether each infusion subunit delivers the drug.

10. The bilateral-driven medical device with infusion and detection integrated of claim 1, wherein:

the bilateral-driven medical device with infusion and detection integrated is composed of a plurality of parts, the drug infusion unit and the program unit are arranged in different parts, and the different parts are connected by waterproof plugs.

* * * * *